May 1, 1962 W. E. BROWN 3,032,499
TREATMENT OF EARTH FORMATIONS
Filed May 23, 1958 5 Sheets-Sheet 1

May 1, 1962 W. E. BROWN 3,032,499
TREATMENT OF EARTH FORMATIONS
Filed May 23, 1958 5 Sheets—Sheet 4

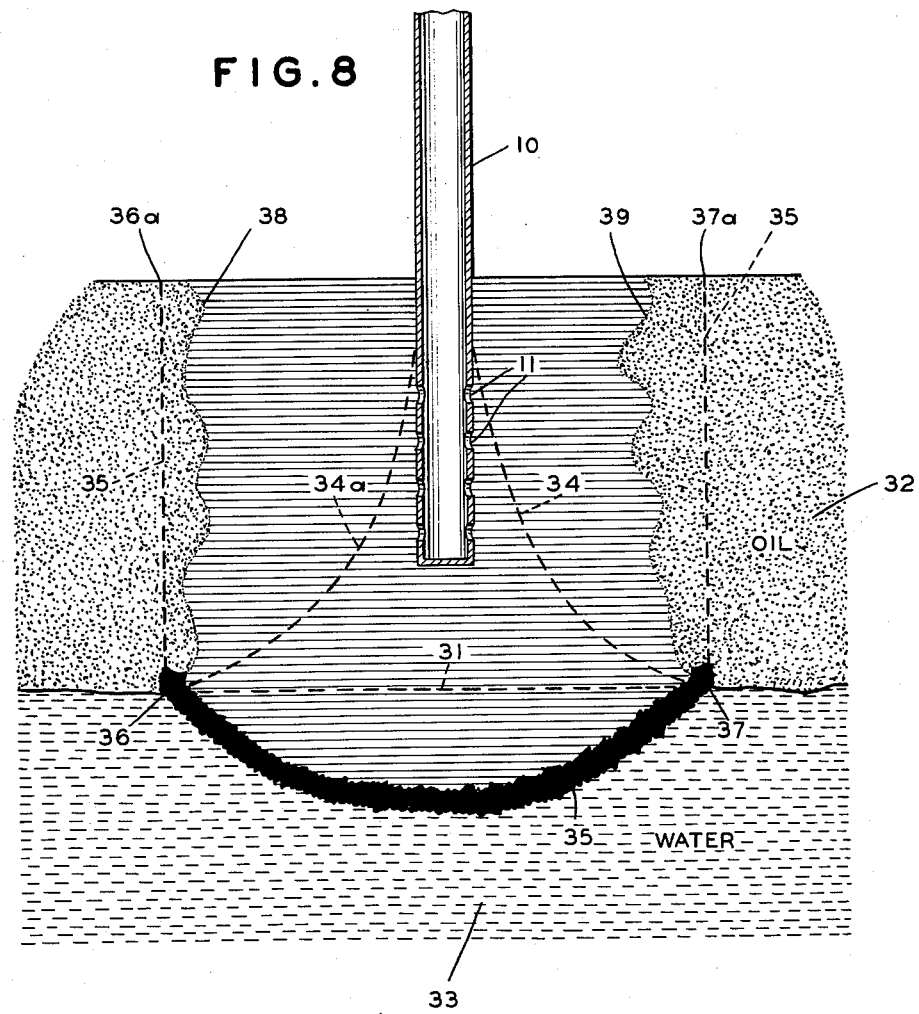

United States Patent Office 3,032,499
Patented May 1, 1962

3,032,499
TREATMENT OF EARTH FORMATIONS
William E. Brown, Richardson, Tex., assignor to The Western Company of North America, a corporation of Delaware
Filed May 23, 1958, Ser. No. 737,286
22 Claims. (Cl. 252—8.55)

The present invention relates to a novel process for selectively blocking the migration of aqueous fluids in a permeable porous body, such as an earth formation and particularly in petroleum wells. More particularly, the present invention relates to a novel process for selectively excluding or blocking the migration of water, without blocking the flow of petroleum, oil, or other water-immiscible liquids, through a porous earth formation and to thereby relieve undesirable situations which often occur in oil wells due to water migration, such as water-coning, water-fingering, uneven permeability in an oil producing zone and other situations in which water is prone to invade an oil zone.

The petroleum production industry has long sought means for alleviating conditions which result in water production in oil wells. Extensive water production is costly not only because of the increased volume of pumping required and the attendant water separation and disposal difficulties, but also because it usually results in reduced oil production. Capillary effects in water-wet reservoir rock and the viscosity ratio of water to oil generally are in favor of water migration and when water enters an oil well it normally increases in volume very rapidly, usually at the expense of oil production. Not only is the proportion of oil reduced in the liquid produced from the well, but it is costly to separate the water from the oil since it is not infrequent that oil-water emulsions form. Expensive emulsion breaking equipment and chemicals are required to provide for the separation of the oil and water phases of such emulsions. Considerable research effort has gone into the search for a means for reducing water production in an oil well but the means which have been developed thus far have not provided the degree of success which the industry has desired.

Among the situations which result in an undesirable amount of water production in an oil well is that condition known as "water-coning." This condition is prone to occur in oil reservoirs which are water driven. Water-coning occurs when water migrates from a lower portion of the poducing zone up into the oil producing section of a well in response to the pressure drop which results in and around the borehole from withdrawal of fluid from the well. The stability of the cone is due to a combination of a dynamic effect and capillary forces wherein the pressure gradient associated with the flow of fluid into the borehole plus capillary action in the pores of the water-wet reservoir rock are able to balance the hydrostatic head of the resulting elevation in the water-oil interface. Capillary forces play an important part in causing the water-cone to rise to a much higher level than would be expected from simple hydrodynamic calculations. A small localized region of lower pressure around a well borehole is sufficient to produce a sizable water cone. The greater the rate of production from the well, the greater the size of the water-cone. As water-coning develops, the water progressively encroaches upward beneath the well until it reaches the borehole and reduces the flow area available for oil entry until the production from the well is largely water, even though much oil remains in the reservoir.

The water-coning phenomenon is illustrated in FIG. 1 of the accompanying drawings, showing a diagrammatic sectional view of an oil well, in which 10 is a well borehole casing having perforations 11 near its lower end, 12 is an oil bearing, permeable stratum having an interface 13 with an underlying water layer 14. As is shown, the coning effect of the water caused by the rise in the interface 13 about the perforations in the borehole casing has resulted in water surrounding most of the perforations. A well in this condition will produce mostly water and the greater the rate of liquid removal from the well the greater the coning effect and amount of water produced from the well.

Another situation which is related to water-coning is "water-fingering." This involves lateral instead of vertical water migration. As shown in FIG. 2 of the drawings, also showing a diagrammatic sectional view of an oil well, the interface 13 between oil zone 12 and water zone 14 has penetrated laterally through the oil zone until it flows through one or more of the perforations 11a in the well bore casing 10. In this phenomenon, the degree of water-fingering and water production will increase with an increase in rate of production from the well.

A related situation which results in unwanted water production exists when an oil well has been fractured inadvertently into a water zone. The resulting sand-filled fracture provides a highly permeable channel connecting the well borehole with the water zone. Even though the fracture may have penetrated a considerable thickness of oil-saturated sand before entering the water zone, the production is usually mostly, if not entirely, water.

Another cause of unwanted water production in an oil well is the presence in a producing formation of thin, highly-permeable strata which permit the penetration of water to the well borehole far in advance of the general water-oil contact. This water can seriously reduce oil production from the oil-saturated zone which remains and at best a large amount of water must be produced to recover the remaining oil. An illustration of this phenomenon is shown in FIG. 3 of the accompanying drawings, which is a diagrammatic sectional view of an oil well. In FIG. 3 the well borehole casing 10 has perforations 11 and 11a. 12a, 12b, 12c and 12d are oil bearing permeable strata having an interface 13 and 13a with water strata 14 and 14a, respectively. As shown, water stratum 14 has permeated laterally at the interface 13 until it surrounds perforations 11a. The presence of shale breaks or other stratified impermeable and low permeability strata in sedimentary reservoir formations creates a similar situation where the barrier prevents a more permeable stratum from acting as a drainage channel for the oil in adjacent zones. This causes the permeable zones to become conduits for water entry into the producing well.

Other situations which result in unwanted water production arise from channels in the cementing surrounding an oil well casing, or from casing leaks or other direct communications between the well borehole and aquifers or water layers. As in the other situations of water entry, oil production is substantially reduced with the attendant disadvantages which result from water production.

A host of methods for shutting off water production and water migration in earth formations has been proposed, many of them elaborate and often unworkable for practical reasons under actual well conditions. Most of these proposals involve a solid plug in the well-bore or a solid block essentially entirely filling the reservoir pores adjacent to the well bore. Those involving a pore plugging mechanism usually require a reaction with water in the pores to produce the block. Not even the materials requiring reaction with water to form a plug can be considered selective since they do not differentiate between the water in a barren zone and connate water in a section with continuous oil-saturation. Thus such methods can and often do block oil-productive zones. The use of a solid material to plug off the bottom of the borehole in a water coning situation has been temporarily successful in some wells. The presence of local shale breaks, however, is probably necessary to derive benefit from such plugs. It is obvious, however, that since the cone passes through a considerable zone of oil saturation, the continued use of bottom plugs to shut off a water cone will block off essentially all of the productive interval long before the oil has been depleted. "Oil-saturated" producing formations always contain connate water of which often little if any is produced. Since this water often occupies more than 20% of the pore space in the rock, it is obvious why severe blocking occurs in oil zones treated with materials which react directly with water to form a plug.

To avoid completely plugging off the oil zone, various schemes have been used including packers, bridge plugs, temporary blocking agents, etc. One method involves setting a packer at the oil-water interface and pumping the blocking agent under the packer into the water zone while injecting oil down the annulus into the oil zone to prevent the block from migrating up into the oil zone. A similar process uses two solutions which react upon contact to form a block at their interface. "Straddle packers" have been used in attempts to inject a thin layer of blocking agent at the oil-water contact. In the latter two cases the bottom of the hole must be plugged to the level of the oil-water contact after the block has been placed. All of these methods presuppose that an actual oil-water contact exists, its location is accurately known, and a packing device can effectively isolate one zone from the other. In actual oil field operations the entry points of the water are often unknown and isolation of one zone from another with a packer is very difficult to accomplish, especially in open hole sections, continuously perforated sections, or sections with slotted or perforated liners. Another method utilizes a cement-filled horizontal fracture at the oil-water interface. The greatest disadvantage of the latter method is the difficulty of controlling the location and plane of such a fracture.

Other methods have been proposed for reducing water production in an oil well which employ a principle known as "reverse wetting." These methods employ surface active agents which merely convert the porous formation from a water-wet to a preferentially oil-wet condition. For the reasons mentioned above, simple reduction of capillary attraction is not sufficient to exclude water from the bore-hole under normal producing conditions.

It is an object of the present invention, therefore, to provide a novel method for selectively blocking the migration of aqueous fluids in a permeable porous body and more particularly for excluding water migration in earth formations and particularly petroleum wells.

It is a further object of the invention to provide a novel process for selectively excluding water without blocking the flow of petroleum, oil, or other water-immiscible liquids, in a porous earth formation.

It is a particular object of the present invention to relieve such undesirable situations as result from unwanted water-producing conditions as water-coning, water-fingering, uneven permeability in an oil-producing zone, and other situations in which water is prone to invade an oil zone.

Additional objects and advantages of the invention will be apparent from this description of the invention, taken in conjunction with the accompanying drawings, in which.

Figure 1:
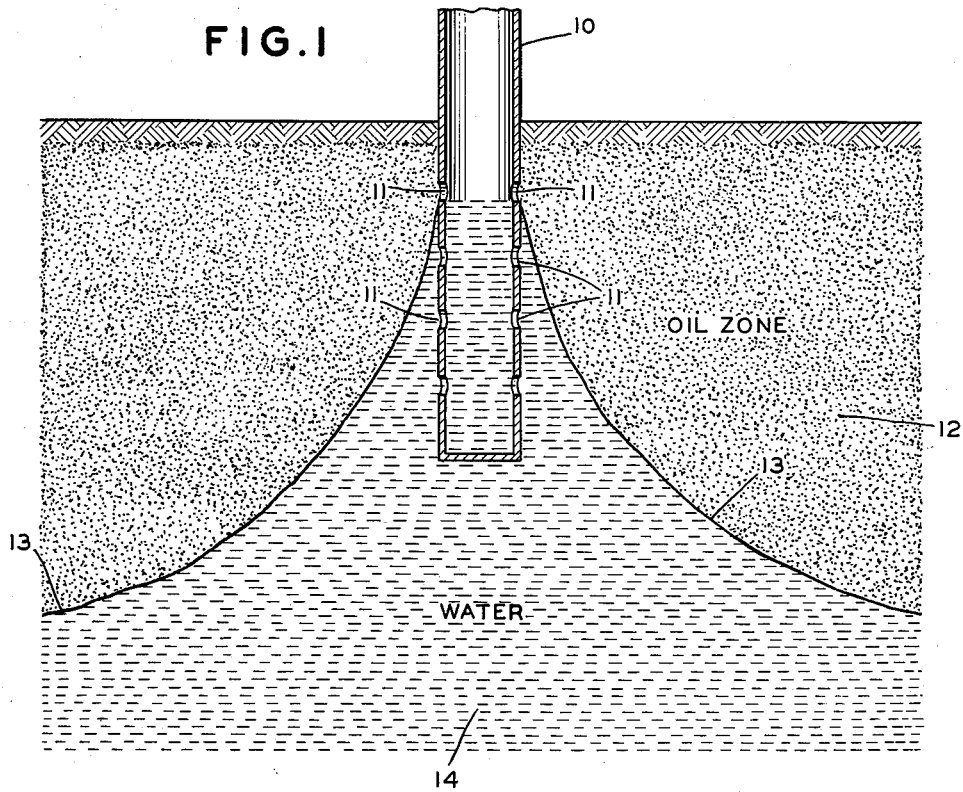
FIG. 1 is a diagrammatic sectional view of a cased oil well illustrating the water-coning phenomenon and how it results in reduction of petroleum recovery in an oil well.
Figure 2:
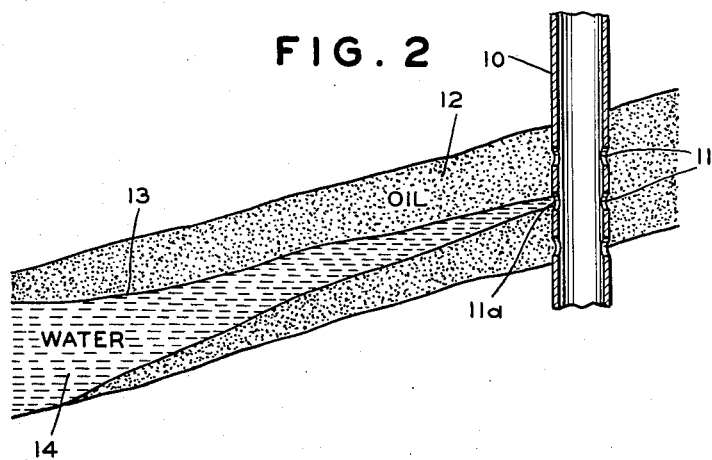
FIG. 2 is a diagrammatic sectional view of a cased oil well illustrating the phenomenon of water-fingering.
Figure 3:
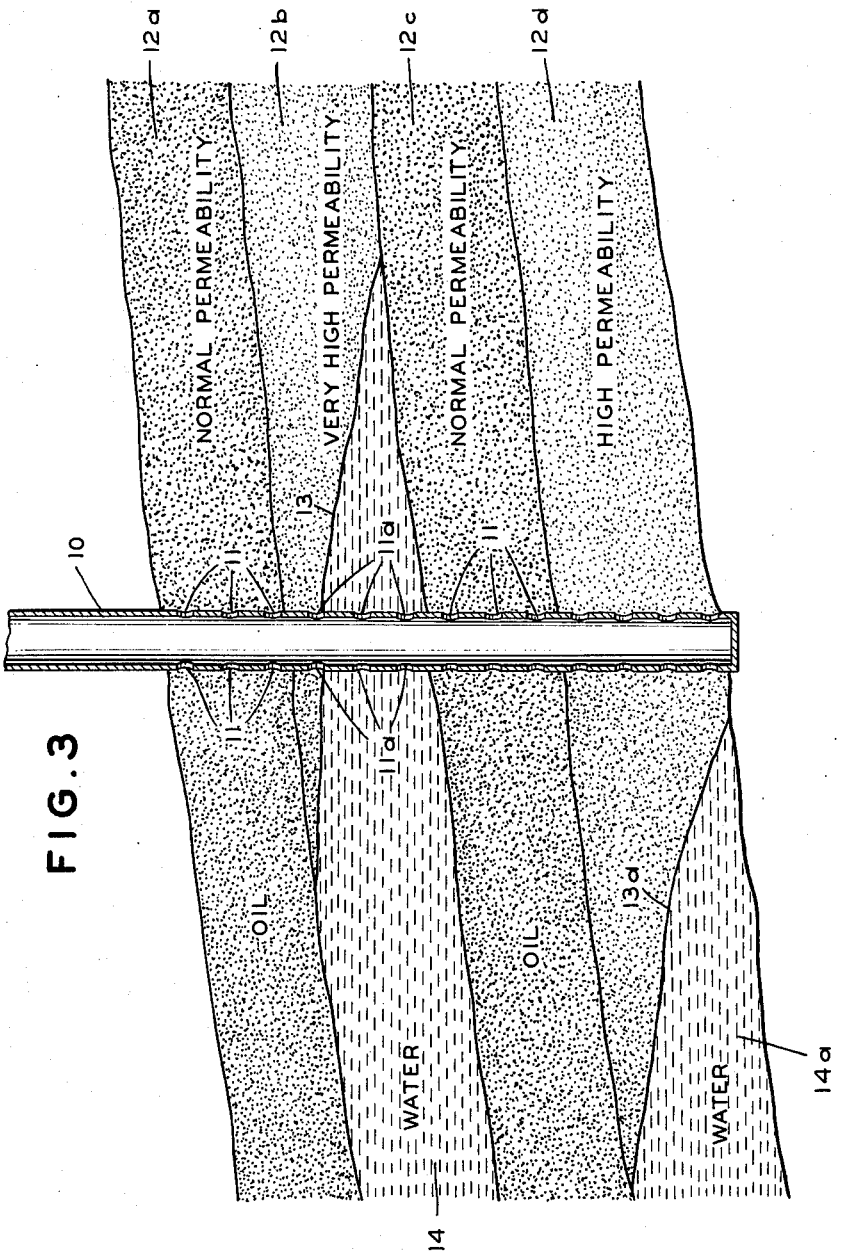
FIG. 3 is a diagrammatic sectional view of a cased oil well showing how thin, highly-permeable strata can result in water production from a well.
Figure 6:
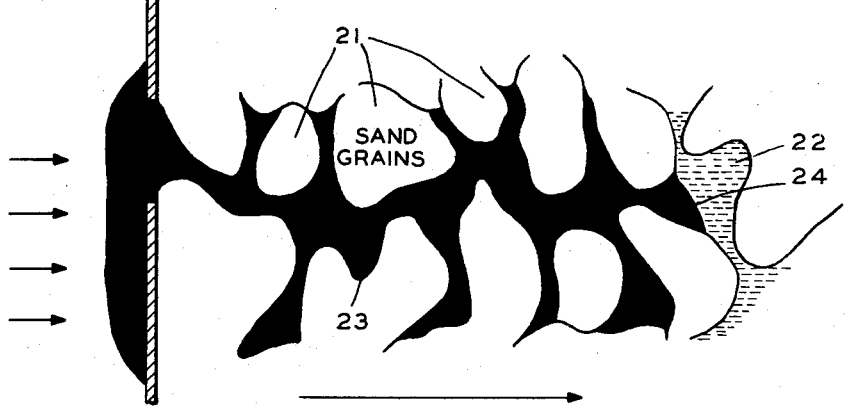
FIG. 6 is a diagrammatic section of a porous sand structure showing how the treating solution employed in the process of the invention displaces the water from the porous sand.
Figure 7:
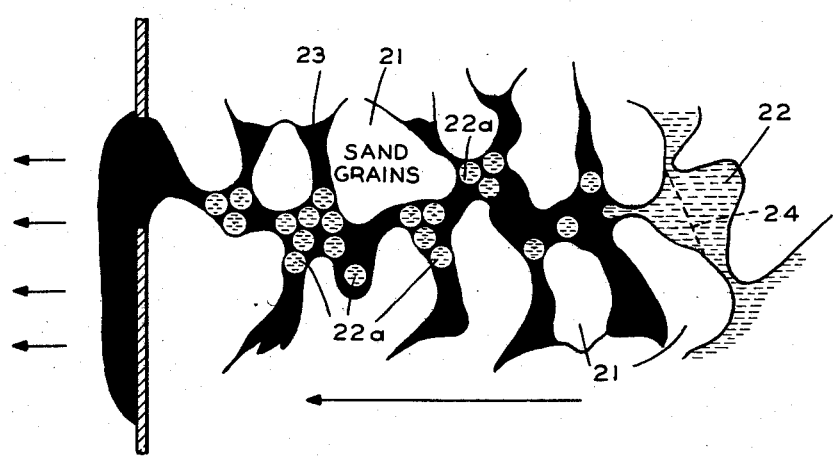

FIG. 7 is a diagrammatic section of the structure of FIG. 6 after the well has been returned to production following treatment in accordance with the process of the invention showing how droplets of water block the pores in the porous structure and prevent reinvasion by water; and FIG. 8 is a diagrammatic sectional view of a cased oil well similar to that of FIG. 1 showing how the process of the invention corrects water-coning by selectively blocking future water invasion without blocking the migration of oil toward the well bore hole.

The foregoing objects and the advantages of the process of the present invention are accomplished by pumping a treating liquid as hereinafter defined, containing an additive, into the well initially at a slow rate, such as at the rate of one-half barrel of treating liquid a minute, and after about half of the treating liquid has been introduced the rate may be increased to about 1 to 2 barrels per minute. Desirably the pressure is controlled so as not to cause hydraulic fractures or extend fractures already existing in the well. Desirably the process is carried out with a packer set as close as possible to the productive stratum. This serves to exclude the water contained in the casing from being pumped into the oil bearing zone ahead of the treatment solution. A packer is not required for wells in which the fluid level can be lowered to the stratum to be treated. In order to insure that the oil-saturated zone extends into the well borehole at the time of the treatment, after the packer has been set the well is pumped at a high rate until immediately prior to treatment. This flushes water out of the oil productive zone near the borehole. It has been demonstrated that with a very slow initial injection rate, the few barrels of water in the tubing and in the borehole under the packer go back into the water zone with little, if any, invasion of the oil zone. When the desired volume of treatment liquid has been pumped into the well, it is further displaced into the formation to the desired distance from the well bore with a quantity of the ordinary or untreated oil as overflush.

The volume of treatment solution or liquid employed may vary over wide limits, depending upon the situation in the well. It has generally been found satisfactory to employ about 1000 to 5000 gallons of treatment solution, followed by about 1000 to 7500 gallons of overflush oil and a quantity of flush oil sufficient to displace the overflush oil from the borehole.

After injecting the treatment solution or liquid into the well bore, followed by the required flushing fluid, a volume approximately equal to about one-half of the overflush fluid is withdrawn from the well, usually by swabbing. This causes the fluids in the well to migrate toward the borehole. Wherever invading water begins to displace the treating solution from the earth formation, a block forms, while in any zone having continuous oil saturation, no block is formed and the treating solution is flushed into the well by the native crude oil. Thus the crude oil is selectively produced while water is selectively blocked from the hole. The mechanism by which this selective blocking operation is accomplished will be discussed hereinbelow. Following treatment the well can be returned to production immediately with a substantial reduction in the water production, although in some cases it is advisable to permit the well to stand for about 24 hours before resuming production.

The mechanism by which water migration is prevented is simple and effective. By converting the pore walls of the porous earth formation from a water-wet to an oil-wet state, any water which enters a pore in a reservoir having intergranular, intercrystalline or small tight-fracture types of porosity, necessarily becomes the internal phase in a funicular distribution of water in oil. As this water reaches and passes through a pore constriction, it is broken into small spherical droplets, which upon further migration will seal subsequent pore constrictions. This is due to the action of the treating solution employed in the process of the invention. The resistance to deformation of these spherical water droplets causes them to have a ball-check-valve action. The interfacial tension between water and oil causes the water droplets to assume a spherical form to thereby provide minimum surface area. Since energy must be expended to increase the surface area of the droplets, they resist deformation. This resistance is directly proportional to the interfacial tension. Therefore, the highest possible interfacial tension would provide the best resistance to water flow. However, it is also true that droplets having a high interfacial tension are not only difficult to form, but are also inherently unstable and tend to coalesce spontaneously. The treatment solutions for use in accordance with the process of the present invention will cause all types of oil reservoir rock to become oil-wet and will aid in the formation of droplets and stabilize them without lowering the interfacial tension to the point where the water droplets will no longer resist deformation. The additives employed in the treatment solutions prescribed for use in the process of the invention make these results possible.

Figure 4:
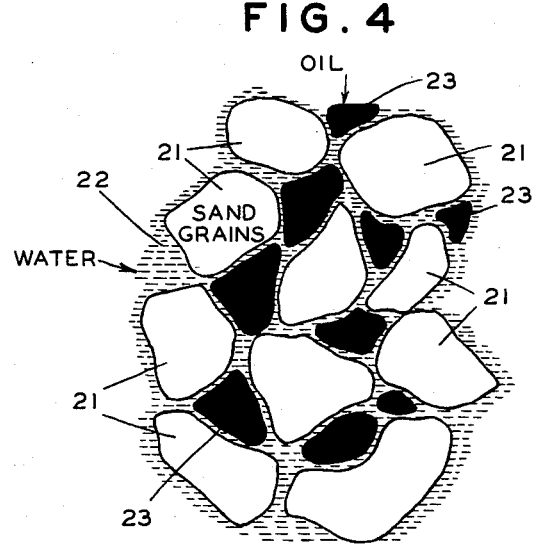
FIG. 4 is a diagrammatic section of a porous sand structure of a water invaded zone of an oil well formation prior to treatment by the process of the invention.
Figure 5:
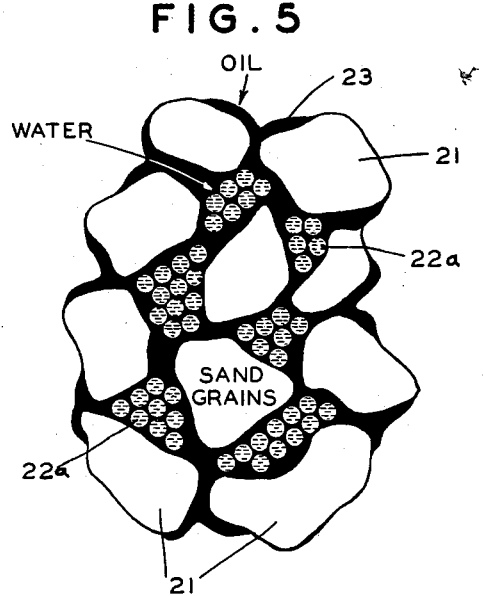
FIG. 5 is a diagrammatic section of a porous sand structure similar to that of FIG. 4, but after treatment with the process of the invention.

The manner in which the process of the present invention transforms a water-invaded area of a porous formation which is water-wet to one which is oil wet and in which droplets of reinvading water are entrapped in the oil phase is illustrated by FIGS. 4 and 5 of the appended drawings. As shown in FIG. 4, sand grains of a porous sand formation which has been invaded by water under conditions prevalent where water-coning, water-fingering and other such conditions exist, has its sand grains 21 wetted with a continuous phase of water 22 in which entrapped particles of oil 23 are surrounded. The water might be characterized as being distributed in the form of pendular rings. The condition which exists after the porous formations has been treated in accordance with the process of the invention and subjected to reinvasion by water is shown in FIG. 5. As shown in FIG. 5, the water is in the form of spherical droplets 22a which assume a funicular distribution in the rock pores and the oil 23 provides the continuous phase which wets the sand grains 21. The funicularly distributed water droplets provide the ball-check-valve action which prevents continued migration of the water through the porous formation.

In the course of the research investigation which resulted in the present invention, experiments were conducted which show that when the treatment solutions of the invention enter water-saturated sand, the water is displaced from the sand with a piston-like action as shown in FIG. 6. As shown, the oil piston 23 drives the water 22 ahead of it at the interface 24. There is no emulsion formation. Upon reversal of liquid flow after well treatment in accordance with the process of the invention, wherever water attempts to penetrate the zone occupied by the treatment solution, a thick emulsion forms and the flow of water is blocked, as shown in FIG. 7. The former oil-water interface 24 has been moved back and the spherical water droplets 22a which form upon initial temporary water migration when the well is returned to operation seal subsequent pore constrictions by providing a ball-check-valve action. The water must become the internal phase upon reversal of flow, because the sand is now oil-wet. Inasmuch as the treatment solution can produce only a water-in-oil emulsion, no droplets form during injection, although they form effectively and immediately upon reversal of flow. In zones where a continuous oil phase is present, the injected treatment fluid merely displaces the oil from the pores and, since a slow rate of injection is used, connate or other water about the well borehole which is displaced by the treated oil, is able to flow radially along the matrix without altering the continuous state of the treatment solution. Upon reversal of liquid flow, crude oil merely flushes the injected fluid out of the formation into the well borehole and the crude oil production can proceed without interruption. Since crude oil is completely miscible with the treatment solution, no block can form in any zone of continuous oil saturation.

The mechanism by which the process of the present invention corrects the condition of water-coning is illustrated by FIG. 8 of the appended drawings. As shown, imaginary line 31 is the interface between the oil-saturated zone 32 and the water-saturated zone 33 before the well is produced. During periods of high production, the interface is elevated in the form of a cone as shown by imaginary lines 34 and 34a. In this condition the connate water covers cost of the perforations 11 in the well bore casing 10. Upon injection of the treating solution through the well bore casing, the treating solution is projected radially from the perforations of the casing as shown by the line 35. This line defines the farthest point of penetration of the treatment solution. Upon returning the well to production, a selective water block is formed in the confines of points 36 and 37 of the line 35. As explained hereinabove, the block formed prevents further migration of water toward the well borehole. Those portions of the line 35 within the confines of 36 and 36a and 37 and 37a are subjected to invasion of oil and in this zone no water block is formed. The oil zone is drawn toward the well borehole as shown at lines 38 and 39. As production proceeds, oil from the oil zone flows smoothly through the well bore and out of the well.

The treatment liquid for use in accordance with the process comprises a solvent containing an additive which is capable of selectively forming an emulsion block only at zones where water invasion occurs, without preventing the migration of oil through the permeable earth formation. The treatment solution shall desirably contain between about 3% and 50% by weight of additive. Preferably the additive shall comprise between about 3 and 10% or 3 and 5% by weight of the solution.

The solvent for the additives employed in the process of the invention may be any solvent which has essentially zero or a low interfacial tension with petroleum oil and a high interfacial tension with water. Desirably the solvents are organic liquids of low polarity which are miscible with petroleum oil and substantially immiscible with water. Best results have been obtained using various crude oils, gas oil, furnace oil, kerosene, gasoline or diesel fuel. These solvents are particularly satisfactory because of their ready availability in the vicinity of oil wells and because of their low cost. Because of its economy, lease crude oil is most satisfactory where cost is an important factor. Also, it is highly compatible with the oil in the formation. Since substantial volumes of treating solution are employed, the economy and availability of the solvent is an important factor. The solvent should be capable of dissolving additive in the concentration in which it will be employed, such as between about 3% and 50% by weight of the total solution. Other organic liquids which may be employed are the halogenated hydrocarbons, such as carbon tetrachloride, chloroform, ethylene dichloride, and methylchloroform. Other hydrocarbon liquids may be employed, such as benzene, pentane, hexane, etc. Certain water-insoluble alcohols have been found to be suitable, such as 3-methoxybutanol, etc. Methylethylketone is quite suitable as a solvent. It will, of course, be apparent that mixtures of solvents may be employed so long as they are capable of dissolving the additive in the desired proportions and yet be miscible with or provide a substantially low interfacial tension with petroleum oil and a high interfacial tension with water.

The additives employed in the treating solutions according to the invention are organic acid-addition salts of N-higher alkyl substituted-alkylenepolyamines or of N-higher alkyl substituted-polyalkylenepolyamines. The organic acid shall desirably contain at least 6 carbon atoms. The higher alkyl substituent is desirably an alkyl group, saturated or unsaturated, containing at least about 10 carbon atoms up to about 30 carbon atoms. More desirably, the additives for use in the present invention are carboxylic or sulphonic acid-addition salts in accordance with the following structural formula:

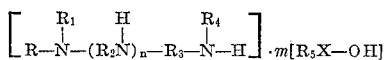

wherein

R is an alkyl group, saturated or unsaturated, containing at least about 10 carbon atoms up to about 30 carbon atoms and preferably at least about 12 carbon atoms up to about 20 carbon atoms. Where $R_5$ is also an alkyl group, the total of R and $R_5$ is desirably at least about 28 carbon atoms and preferably at least about 34 carbon atoms.

$R_1$ and $R_4$ are either hydrogen atoms or aliphatic groups containing up to about 18 carbon atoms and preferably less than 12 carbon atoms.

$R_2$ and $R_3$ are lower alkylene groups containing from about 2 to 10 carbon atoms, preferably from between about 2 and 6 carbon atoms.

$R_5$ is an alkyl or alkylaryl group containing at least about 5 carbon atoms and preferably at least about 10 or 12 carbon atoms up to about 30 carbon atoms.

$n$ is zero or a small whole number from 1 to 6, preferably zero or a whole number from about 1 to 3.

$m$ is a small whole number equal to $n$, $n+1$ or $n+2$, but must be at least one and preferably equal to $n+2$.

X is a carbonyl group or the groups $-SO_2-$, $-PO(OH)$ or $-OPO(OH)$.

The preferred additives for use in the process of the present invention are the dioleate, dilinoleate and dielaidate salts of N-tallow-propylenediamine and mixtures thereof. The dioleate salt of N-tallow-propylenediamine is available commercially under the trademark "Duomeen T-dioleate." The N-tallow-propylenediamine is available commercially under the trademarks "Duomeen T" and "Diam 26." The tallow fatty acids from which the tallow alkyl substituents of the propylenediamine is obtained contain a mixture of principally the octadecyl, octadecenyl and hexadecyl groups. One additive which has been found to be particularly advantageous for use in the process of the present invention is the salt produced by reacting one molecular proportion of "Duomeen T" (N-tallow-propylenediamine) and two molecular proportions of tall oil fatty acid mixtures sold under the tradename "Crofatol P," which contains about 85% fatty acids including 16% oleic, 16% elaidic and 60% linoleic acids. Salts of acids containing phosphorous are generally less suitable.

I have discovered that best results to date are obtained employing organic acid-addition salts of N-higher alkyl substituted alkylenepolyamines in which mixtures of organic acids and higher alkyl substituents are employed. Thus salts produced from mixtures or less pure commercial fatty acid mixtures such as the less pure tall oil materials appear to provide results which are superior to the acid-addition salts produced from relatively pure components, such as substantially pure oleic acid. Similarly, mixed higher alkyl groups present in tallow are superior to alkyl derivatives derived from a single material.

Salts of di-basic and tri-basic acids, as well as mono-basic acids, may be employed. In some instances the salts produced therefrom are less soluble in oil. This is particularly true of salts produced from a trimer of polymerized oleic acid. Better solubility characteristics can be attained either by limiting the molecular weight of the salt or by preparing it in very dilute solution or adding a portion of monomeric oleic acid as a chain stopper.

During the research investigation which resulted in the present invention, a number of somewhat related types of amines and their salts were employed but were found to be unsuitable for use in the process of the present invention. Thus, for example, propylenediamine dioleate (not having an alkyl substituent on one of the nitrogen atoms) was not suitable. Also, the base, N-tallow-propylenediamine was not suitable. It was also discovered that the acid from which the acid-addition salt is produced must be an organic acid. Thus, N-tallow-propylenediamine dihydrochloride is unsuitable. It has been discovered that additives having the particular chemical structure defined hereinabove are essential if satisfactory selective sealing of water is to be obtained without also blocking the migration of oil through a porous earth structure. These additives are not normally considered to be very effective surface active agents for ordinary purposes since they do not reduce the interfacial tension between oil and water to very low value.

The acid-addition salts of the present invention are readily produced from the desired commercially available acids and N-alkyl substituted alkylenepolyamines. A number of the acid-addition salts suitable for use in the present invention are those commercially available. Listed below are some of the suitable acid-addition salts which provide satisfactory additives for use in the process of the present invention:

N-tallow-propylenediamine dioleate (Duomeen T-dioleate or Diam 26 dioleate)

N-soya-propylenediamine dioleate (Duomeen S dioleate). (The soya alkyl groups are derived from soy bean oil fatty acids. These alkyl groups comprise a mixture of essentially octadecyl, octadecenyl, octadecadienyl, hexadecyl)

N-coconut-propylenediamine dioleate (Duomeen C dioleate). (The coconut oil alkyl groups are derived from coconut oil fatty acids. These alkyl groups comprise primarily tetradecyl and dodecyl groups with smaller amounts of octadecyl, octadecenyl, hexadecyl, decyl and octyl groups)

N-laurylpropylenediamine dioleate (Duomeen 12 dioleate). (The lauryl group is prepared from commercially available fatty acids and contains about 90% dodecyl, 9% tetradecyl and 1% octadecenyl)

N-tallow-diethylenetriamine dioleate

N-tallow-propylenediamine di-rosin acids. (The rosin acids are derived from high molecular weight resins)

N-tallow-propylenediamine di-header acids. (The header acids are by-products produced from the esterification of tall oil and comprise primarily oleic acid)

N-tallow-propylenediamine di-behenate. (Behenic acid is a carboxylic acid of the formula $C_{21}H_{43}COOH$)

N-tallow N,N'-dimethyl-propylenediamine dioleate

N-oleyl N,N'-diethyl-propylenediamine dioleate

N-tallow-propylenediamine distearate

N-tallow-propylenediamine dilinolenate

N-tallow-propylenediamine di-Crofatol-O. (The Crofatol O is a composition derived from tall oil containing 58% mixed fatty acids, including oleic acid)

N-tallow-propylenediamine monooleate

N-tallow-propylenediamine dipalmitate

N-tallow-propylenediamine dilaurate

N-tallow-propylenediamine dicaprate

N-lauryl-propylenediamine distearate

N-oleyl-propylenediamine dioleate

Di-N-tallow propylenediamine-mono-dimer of polymerized oleic acid

N-tallow-propylenediamine-dimer of polymerized oleic acid
N-tallow-propylenediamine dodecyl-benzenesulfonate
N-tallow propylenediamine stearyl acid phosphate
N-tallow-propylenediamine benzene phosphoric acid salt Preferred results are obtained in accordance with the process of the invention when a co-additive is employed in the treatment liquid. These co-additives are substances which are soluble in oil or other treatment solvent but which will diffuse to an oil-water interface and react with the water to form a highly viscous gel or solid. In employing these co-additives it is possible to solidify the water droplets which are occluded in the water-in-oil emulsion which results upon re-invasion or migration of water into a treated zone, thereby producing a more resistant ball-checkvalve action. These co-additives produce very little change in the oil zone of the well, the solidification or gelling occurring only in and around the water drops which form in the water zone. The co-additive must therefore be capable of reacting with water.

Among suitable co-additives are certain silicon-containing, oil-soluble compounds such as the ethyl silicates, methyl sodium silanolate, methyl polysiloxane and other silicone resins, such as mixtures of silane esters, for example mixtures of methyltriethoxysilane and dimethyldiethoxysilane or methyltriethoxysilane and phenyl-triethoxysilane. Hydrolyzable derivatives of silane in general satisfy the requirements of a suitable co-additive. These include the silyl amines, silane esters, siloxane esters and their sulfur analogs. Hydrolizable derivatives of silane in which at least one of the hydrogen atoms attached to the silicon atom has been substituted by an alkyl or aryl radical attached to the silicon atom through an oxygen atom are quite suitable. Such compounds may have the structural formula:

$$Si(OR)_nX_{4-n}$$

wherein R is alkyl or aryl and X is a hydrogen atom or a lower alkyl group containing not more than about 3 carbon atoms each or their equivalents and $n$ is a value from 1 to 4, inclusive. Not more than one X group may be an aryl group, such as phenyl. Some of these suitable compounds include:

Tetra ethyl silicate
Tetra phenyl silicate
Di-ethyl silicon oxide
Methyl triethoxy silane
Dimethyl diethoxy silane
Phenyl methyl diethoxy silane, etc.

Co-additives, such as silicon tetrachloride, which are capable of forming a solid or viscous gel upon reaction with water, but which generate strong acids, are not suitable because the resulting strong acid decomposes the acid-addition salt of the additive thereby releasing free fatty acids. This reduces the effectiveness of the treatment.

Asphaltic materials such as asphalt, blown asphalt, asphaltenes, etc., dissolved or dispersed in the treating solution can also be used to form a film or precipitate when in contact with water and are therefore suitable as co-additives. It has been observed that the use of asphaltic crudes as solvents in this process gives a more substantial block than the use of distilled petroleum solvents such as kerosene or diesel fuel. Similarly, the addition of asphaltic materials to the kerosene, diesel fuel, crude oil, etc., used as the solvent can improve the blocking action by forming a solid film at the oil-water interface. A treating solution comprising 5% by weight of asphalt in kerosene gives suitable results, although quantities from 0.5 to 15% are effective. Depending upon the solubility of the asphaltic material in the treatment liquid, greater or lesser concentrations may be used effectively.

Good results have been obtained with the ethyl silicates as co-additives. "Ethyl Silicate 40" (mixed ethyl polysilicates having an average of 5 silicon atoms per molecule, containing at least about 40% silica) of Carbide and Carbon Chemical Co., has been found to be particularly satisfactory. This material is believed to be eminently satisfactory primarily because of its high silica content, since the hydrolysis reaction which occurs upon exposure to the water droplets forms silica gel.

Varying proportions of co-additive may be employed but between about 2 and 10% by weight has been found to be satisfactory. Best results are obtained with 5% by weight of "Ethyl Silicate 40."

When employing the ethyl silicates and other hydrolyzable silane derivatives as the co-additive, it is desirable to employ a basic material to catalyze the hydrolysis which results upon exposure to the emulsified water droplets. The lower molecular weight amines and ammonium hydroxide have provided best results for this purpose. Among the preferred amines are methylamine, ethylamine, propylamine, 3-ethoxypropylamine, 3-methoxypropylamine, etc. Varying proportions of basic catalyst may be employed but about 0.5 to 5% by weight of treating solution have been found satisfactory, with the preferred concentration being about 1% by weight.

The process of the present invention is effective in treating porous materials having pore constrictions and is less likely to be effective in formations having large open fractures, vugs, solution channels, and the like. Where the porous material being treated possesses flow channels of sufficient size for the water droplets which form during the treatment to pass without distortion, no water blocking effect is obtained. For conditions of this character it is desirable to employ with the treatment solution, finely divided solids which will fill the voids, vugs, etc. and produce granular porosity. Finely-divided solids which may be employed for this purpose are ground walnut shells, lead shot, ground limestone, glass or plastic beads, and sand, preferably the latter. The divided solids employed for this purpose are desirably primarily in the 20 to 150 mesh particle size range.

In order to more clearly disclose the nature of the present invention, field tests illustrating the process of the invention will hereafter be described. It should be understood, however, that this is done solely by way of example and is intended neither to delineate the scope of the invention or limit the ambit of the appended claims.

*Example 1*

In this field test, exemplifying a test on a producing oil well in the Grayburg formation in Texas, a well which had been producing 8 barrels of oil per day and 100 barrels of water per day was treated in accordance with the process of this invention. From well tests prior to treatment and from the results obtained by the treatment it was apparent that the well was suffering from water intrusion. The Grayburg formation is characterized by tight intercrystalline porosity and the well in question had been subjected to random fractures in 8 zones. At the start of the treatment, a barrel of ordinary lease oil was injected slowly down the casing into the well at the rate of ½ barrel per minute. This was followed by 4,000 gallons of diesel fuel No. 2 containing 5% by weight of "Duomeen T"-dioleate, pumped at the same rate for the first 2,000 gallons and then increased to a rate of 1 barrel per minute. The treating solution was followed by 6,600 gallons of overflush lease crude oil and 1,750 gallons of flush lease crude oil. About 4,000 gallons of oil was removed by swabbing immediately after the treatment. The well was then shut in for two days and then subjected to ordinary pumping operations. The pumping of the well was continued in this fashion. After 12 days from the start of the pumping operations, the well was delivering 36 barrels of oil per day and no water. At the end of the 19 days of pumping, the well was delivering 27 barrels of oil per day and 10 barrels of water.

One month later the well was delivering 21 barrels of oil per day and 5 barrels of water per day. Thus after one month, the oil production had increased more than 260%, whereas the water production had decreased by 95%. After 6½ months of production, following treatment in accordance with the process of this invention, the well was producing 7.5 barrels of oil per day and 1.1 barrels of water per day, a 99% reduction in water.

It is apparent from the results obtained in the foregoing test that the process of the invention successfully selectively reduced the water production while at the same time it increased the oil production of the well. It is also apparent that the treatment was effective over a long period of time.

*Example 2*

In this field test exemplifying a test on a producing oil well in the San Andres formation in Texas, a well which had been producing 3 barrels of oil per day and 40 barrels of water per day was treated in accordance with the process of this invention. From well tests prior to treatment and from the results obtained by the treatment it was apparent that the well was suffering from water-intrusion. A packer with 2" tubing was set in this well immediately above the top of the oil zone. At the start of the treatment one barrel of lease oil was injected slowly down 2" tubing at the rate of ½ barrel per minute. This was followed by 3,000 gallons of lease crude containing 5% by weight of the salt formed with "Duomeen T" and two equivalents of "Crofatol P," pumped at the rate of about 0.7 to 1.0 barrel per minute for the first 2000 gallons, and thereafter at a rate of one barrel per minute. ("Crofatol P" is a composition containing 85% fatty acids derived from tall oil consisting primarily of linoleic acid.) The treating solution was followed by 1,750 gallons of overflush lease crude and 400 gallons flush lease crude. About 1,500 gallons of fluid was removed immediately after the treatment. The well was shut in for about one day while the pump was reinstalled, and then the well was subjected to ordinary pumping operations. No water was produced from this well after it was treated. After 5½ months the well was still producing one barrel of oil per day and no water. This test demonstrates the efficiency of this process in excluding water from oil wells.

*Example 3*

In this field test exemplifying a test on a producing oil well in the Wolfcamp sand in Texas, a well which had been producing 22 barrels of oil per day and 96 barrels of water per day was treated in accordance with the process of this invention. From well tests prior to treatment and from the results obtained by the treatment it was apparent that the well was suffering from water-intrusion. The Wolfcamp sand in this well is characterized by intergranular porosity in a clean sand. A packer on 2" tubing was set in this well immediately above the top of the oil zone. At the start of the treatment 1 barrel of lease oil was injected slowly down 2" tubing at the rate of ½ barrel per minute. This was followed by 1,500 gallons of diesel fuel containing 5% by weight of the salt formed with "Duomeen T" and two equivalents of "Crofatol P," 5% by weight of "Ethyl Silicate 40" and 1% by weight of ammonium hydroxide (28%), which was pumped at the rate of 0.5 barrel per minute. The treating solution was followed by 1,000 gallons of overflush lease crude and 900 gallons of flush lease crude oil pumped at a rate of 1 barrel per minute. About 1,000 gallons of oil was swabbed from the well immediately after the treatment. After 7 days from the start of the pumping operation the well was delivering 43 barrels of oil per day and 75 barrels of water per day. Two weeks after the treatment the well was delivering 30 barrels of oil per day and 60 barrels of water per day. This test illustrates the effect of this process when applied to fairly permeable sand, a 37% reduction in water and a 36% increase in oil being realized. It is believed that much of the water production in this well is connate water produced along with the oil.

*Example 4*

In this field test exemplifying a test on a producing oil well in the Cypress sand formation in Illinois, a well which had been producing 8 barrels of oil per day and 160 barrels of water per day was treated in accordance with the process of this invention. From well tests prior to treatment and from the results obtained by the treatment it was apparent that the well was suffering from water-coning. This formation is characterized by fairly high permeability in clean sand. A packer on two-inch tubing was set immediately above the oil zone in this well. At the start of the treatment, a barrel of ordinary lease oil was injected down the 2" tubing at the rate of ½ barrel per minute. This was followed by 4,500 gallons of lease crude oil containing 5% by weight of the salt formed with "Duomeen T" and two equivalents of "Crofatol P," 5% by weight of "Ethyl Silicate-40" and 1% by weight of ammonium hydroxide (28%), pumped at the rate of 0.5 barrel per minute for the first 1,000 gallons, and then increased to a rate of about 0.75 barrel per minute. The treating solution was followed by 4,000 gallons of overflush and 500 gallons flush lease crude. About 2,500 gallons of oil was swabbed from the well immediately after treatment. The well was shut in while the pump was replaced and then subjected to ordinary pumping operations. One month later the well stabilized at a production of 8 barrels of oil per day and 65 barrels of water per day. This test illustrates a 60% reduction in water production in a fairly permeable sandstone.

In the foregoing description, the selective water blocking process of the present invention has been described primarily in connection with the treatment of producing oil wells. However, the process has other important applications. The process is applicable to any situation where water migration tends to take place in a porous medium. Thus, in drilling wells where air or gas is used for cutting removal, etc., instead of the conventional drilling muds, the process of the invention may be employed to prevent water from entering the hole. Other situations where it is desirable to prevent water migration through earth formations, such as in dams and their foundations, pond bottoms and earth forms surrounding mines and tunnels, etc., may be improved by means of the process of the present invention.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process of selectively blocking the migration of aqueous fluids in a permeable porous body comprising injecting into said body a low polarity liquid containing between about 3% and 50% by weight of an organic acid-addition salt of an N-higher alkyl substituted-alkylene polyamine in which the organic acid contains at least about 6 carbon atoms.

2. A process as defined by claim 1 wherein the organic acid-addition salt of the N-higher alkyl substituted-alkylene polyamine comprises between about 3 and 5% by weight of the injection liquid.

3. A process as defined by claim 1 wherein the N-higher alkyl substituent contains between about 10 to 30 carbon atoms.

4. A process as defined by claim 1 wherein the low polarity liquid comprises a liquid hydrocarbon.

5. A process as defined by claim 1 wherein the N-higher alkyl substituted-alkylene polyamine is N-tallow-propyl-enediamine.

6. A process as defined by claim 1 wherein the N-higher alkyl substituted-alkylene polyamine is N-soyapropylenediamine.

7. A process as defined by claim 1 wherein the organic acid-addition salt of an N-higher alkyl substituted-alkylene polyamine is N-tallow-diethylenetriamine dioleate.

8. A process as defined by claim 1 wherein the organic acid-addition salt of an N-higher alkyl substituted-alkylene polyamine is N-lauryl-propylenediamine dioleate.

9. A process as defined by claim 1 wherein the organic acid-addition salt of an N-higher alkyl substituted-alkylene polyamine is N-soya-propylenediamine dioleate.

10. A process of selectively blocking the migration of aqueous fluids in a permeable porous body comprising injecting into said body a low polarity liquid containing between about 3% and 50% by weight of an organic acid-addition salt having the following structural formula:

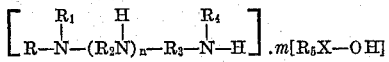

wherein R is an alkyl group containing at least about 10 carbon atoms, $R_1$ and $R_4$ are members selected from the class consisting of hydrogen atoms and aliphatic groups, $R_2$ and $R_3$ are lower alkylene groups, $R_5$ is a member selected from the class consisting of alkyl and alkylaryl groups and which contains at least about 5 carbon atoms, $n$ is a whole number from 0 to 6, $m$ is a small whole number between $n$ and $n+2$, and X is a member selected from the class consisting of a carbonyl group and the groups $-SO_2-$, $-PO(OH)$ and $-OPO(OH)$.

11. A process as defined by claim 10 wherein the organic acid-addition salt comprises between about 3 and 10% by weight of the injection liquid.

12. A process of selectively blocking the migration of aqueous fluids in a permeable porous body comprising injecting into said body a low polarity liquid containing between about 3 to 50% by weight of N-tallow-propylenediamine dioleate.

13. A process of selectively blocking the migration of aqueous fluids in a permeable porous body comprising injecting into said body a low polarity liquid containing between about 3% and 50% by weight of an agent comprising an organic acid-addiiton salt of an N-higher alkyl substituted-alkylene polyamine in which the organic acid contains at least about 6 carbon atoms and a co-agent capable of reacting with water to form a member selected from the class consisting of a highly viscous gel and solid and which is insoluble in water.

14. A process as defined by claim 13 wherein the co-agent is an organic silicon-containing oil-soluble compound.

15. A process as defined by claim 13 wherein the co-agent is an asphaltic material.

16. A process as defined by claim 14 wherein there is also present a basic compound capable of catalyzing a hydrolysis reaction between water and the organic silicon-containing co-agent.

17. A process as defined by claim 14 wherein the co-agent is a lower alkyl silicate.

18. A liquid composition capable of selectively blocking the migration of aqueous fluids in a permeable porous body comprising a low polarity liquid containing between about 3% and 50% by weight of an agent comprising an organic acid-addition salt of an N-higher alkyl substituted-alkylene polyamine in which the organic acid contains at least about 6 carbon atoms and a co-agent capable of reacting with water to form a member selected from the class consisting of a highly viscous gel and solid.

19. A liquid composition as defined by claim 18 wherein the co-agent is an organic silicon-containing oil-soluble compound.

20. A liquid composition as defined by claim 18 wherein there is also present a basic compound capable of catalyzing a hydrolysis reaction between water and the organic silicon-containing co-agent.

21. A liquid composition as defined by claim 18 werein the co-agent is a lower alkyl silicate.

22. A liquid composition as defined by claim 18 wherein the co-agent is an asphaltic material.

References Cited in the file of this patent
UNITED STATES PATENTS

| | | |
|---|---|---|
| 2,452,736 | Eickmeyer | Nov. 2, 1948 |
| 2,779,418 | Garst | Jan. 29, 1957 |
| 2,792,894 | Graham et al. | May 21, 1957 |
| 2,805,720 | Wiegand | Sept. 10, 1957 |
| 2,816,610 | Fischer | Dec. 17, 1957 |
| 2,840,584 | Jones | June 24, 1958 |
| 2,876,840 | Berry | Mar. 10, 1959 |